US010142414B2

(12) United States Patent
Chen et al.

(10) Patent No.: US 10,142,414 B2
(45) Date of Patent: Nov. 27, 2018

(54) METHOD AND DEVICE FOR SHARING PICTURE

(71) Applicant: Xiaomi Inc., Beijing (CN)

(72) Inventors: Zhijun Chen, Beijing (CN); Tao Zhang, Beijing (CN); Wendi Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 17 days.

(21) Appl. No.: 15/077,699

(22) Filed: Mar. 22, 2016

(65) Prior Publication Data
US 2016/0316012 A1  Oct. 27, 2016

(30) Foreign Application Priority Data

Apr. 21, 2015  (CN) .......................... 2015 1 0191109

(51) Int. Cl.
*H04L 29/08* (2006.01)
*G06F 17/30* (2006.01)
(Continued)

(52) U.S. Cl.
CPC .... *H04L 67/1095* (2013.01); *G06F 17/30274* (2013.01); *G06K 9/00248* (2013.01); *G06K 9/00288* (2013.01); *H04L 65/403* (2013.01)

(58) Field of Classification Search
CPC .................... H04L 67/00; H04L 67/42; H04L 65/00–65/80; G06F 17/30244–17/30793; G06K 9/00–9/00288
See application file for complete search history.

(56) References Cited

U.S. PATENT DOCUMENTS 8,925,106 B1 * 12/2014 Steiner .................... G06F 21/31
726/28
2004/0156535 A1 * 8/2004 Goldberg ............. G03D 15/001
382/115
(Continued)

FOREIGN PATENT DOCUMENTS

CN  102025654 A  4/2011
CN  102571705 A  7/2012
(Continued)

OTHER PUBLICATIONS

International Search Report dated Feb. 5, 2016 for International Application No. PCT/CN2015/095153, 4 pages.
(Continued)

*Primary Examiner* — Clayton R Williams
(74) *Attorney, Agent, or Firm* — Brinks Gilson & Lione (57) ABSTRACT

The present disclosure relates to a method and a device for sharing a picture, which facilitates the user to manage pictures in the shared album. The method includes determining whether a picture to be synchronized to a shared album in a cloud server is present in a terminal, determining whether a face feature in the picture matches with a predefined face feature in a first list when the picture to be synchronized to a shared album in the cloud server is present in the terminal, the first list including one or more predefined face features relating to people associated with the shared album, and storing the picture in the shared album when the face feature in the picture matches with a predefined face feature in the first list. The technical solutions of the present disclosure may realize a shared album in a unit of person corresponding to a predefined face feature, which facilitates the user to manage pictures in the shared album.

11 Claims, 5 Drawing Sheets

(51) Int. Cl.
*H04L 29/06* (2006.01)
*G06K 9/00* (2006.01)

(56) References Cited

U.S. PATENT DOCUMENTS

| | | | |
|---|---|---|---|
| 2009/0034805 A1* | 2/2009 | Perlmutter | G06F 17/30256 382/118 |
| 2009/0248703 A1 | 10/2009 | Tsukagoshi et al. | |
| 2009/0252383 A1* | 10/2009 | Adam | G06K 9/00288 382/118 |
| 2011/0064281 A1* | 3/2011 | Chan | G06Q 50/01 382/118 |
| 2012/0314917 A1 | 12/2012 | Kiyohara et al. | |
| 2013/0021368 A1* | 1/2013 | Lee | H04N 1/00153 345/619 |
| 2013/0103742 A1 | 4/2013 | Hsi | |
| 2015/0033362 A1* | 1/2015 | Mau | G06K 9/00288 726/27 |
| 2015/0131872 A1* | 5/2015 | Ganong | G06K 9/00677 382/118 |
| 2015/0161483 A1* | 6/2015 | Allen | G06K 9/00221 382/118 |

FOREIGN PATENT DOCUMENTS

| | | |
|---|---|---|
| CN | 103369031 A | 10/2013 |
| CN | 103399896 A | 11/2013 |
| CN | 104168378 A | 11/2014 |
| CN | 104284252 A | 1/2015 |
| CN | 104852967 A | 8/2015 |
| EA | 009793 B1 | 4/2008 |
| EP | 1 836 614 | 1/2010 |
| EP | 1 836 614 A4 | 1/2010 |
| JP | 2009-146079 A | 7/2009 |
| JP | 2009-259238 A | 11/2009 |
| JP | 2010-66994 A | 3/2010 |
| JP | 2013-541060 A | 11/2013 |
| KR | 10-2010-0129783 A | 12/2010 |
| RU | 2 453 069 C2 | 6/2012 |
| RU | 2 460 119 C2 | 8/2012 |

OTHER PUBLICATIONS

Office Action dated Oct. 13, 2017 for Mexican Application No. MX/a/2016/003866, 6 pages.
English Translation of International Search Report dated Feb. 5, 2016 for International Application No. PCT/CN2015/095153, 6 pages.
Office Action dated Jul. 18, 2017 for Japanese Application No. 2017-513310, 4 pages.
Office Action dated Dec. 21, 2016 for Korean Application No. 10-2016-7001674, 4 pages.
Office Action dated May 5, 2017 for Russian Application No. 2016109778/08, 13 pages.

\* cited by examiner

# METHOD AND DEVICE FOR SHARING PICTURE

CROSS-REFERENCE TO RELATED APPLICATIONS

This application is based upon and claims priority to Chinese Patent Application No. 201510191109.2, filed Apr. 21, 2015, the entire contents of which are incorporated herein by reference.

TECHNICAL FIELD

The present disclosure generally relates to technical field of Internet, and more particularly, to a method and a device for sharing a picture.

BACKGROUND

With an increasing number of functions of a cloud server, the cloud server saves a large number of pictures for terminal users by using a cloud synchronization manner. In the related art, when a user wants to share a picture with other persons via a cloud album, the user needs to determine the picture, and share the specific picture. When a terminal user newly captures some pictures via a terminal, the newly captured pictures may be uploaded to the cloud server via a real time synchronization manner.

SUMMARY

The embodiments of the present disclosure provide methods and devices for sharing pictures, so as to facilitate the user to manage pictures in the shared albums.

According to a first aspect of embodiments of the present disclosure, there is provided a method for sharing a picture on a cloud server. The method includes determining whether a picture to be synchronized to a shared album in the cloud server is present in a terminal, determining whether a face feature in the picture matches with a predefined face feature in a first list when the picture to be synchronized to a shared album in the cloud server is present in the terminal, the first list one or more predefined face features relating to people associated with the shared album, and storing the picture in the shared album when the face feature in the picture matches with a predefined face feature in the first list.

According to a second aspect of embodiments of the present disclosure, there is provided a device for sharing a picture, including a processor, and a memory for storing instructions executable by the processor. The processor is configured to determine whether a picture to be synchronized to a shared album in the device is present in a terminal, determine whether a face feature in the picture matches with a predefined face feature in a first list when the picture to be synchronized to a shared album in the device is present in the terminal, the first list including one or more predefined face features relating to people associated with the shared album, and store the picture in the shared album when the face feature in the picture matches with a predefined face feature in the first list.

According to a third aspect of the embodiments of the present disclosure, there is provided a non-transitory computer-readable storage medium including instructions, executable by a processor in a server, for performing a method for sharing a picture. The method includes determining whether a picture to be synchronized to a shared album in the server is present in a terminal, determining whether a face feature in the picture matches with a predefined face feature in a first list, the first list including one or more predefined face features relating to people associated with the shared album, and storing the picture in the shared album when the face feature in the picture matches with a predefined face feature in the first list.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
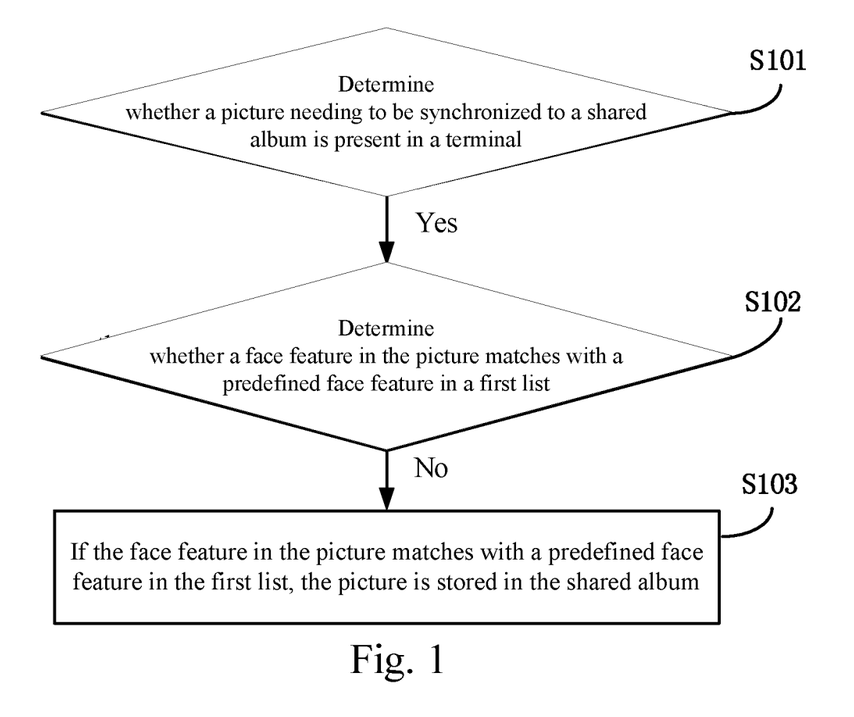
FIG. 1 is a flow chart of a method for sharing a picture, according to an exemplary embodiment.

FIG. 1 is a flow chart of a method for sharing a picture, according to an exemplary embodiment. The method for sharing a picture may be applied in a server. As shown in FIG. 1, the method for sharing a picture includes the following steps S101-S103.

In step S101, it is determined whether a picture needing to be synchronized to a shared album is present in a terminal.

In an embodiment, the picture needing to be synchronized to a shared album may be in a smart terminal (such as a smart mobile phone, and a tablet computer) corresponding to a user identification corresponding to the shared album, or may be from a smart terminal corresponding to a user identification having a cloud permission to synchronize to the shared album. For example, the user identification having a cloud permission to synchronize to the shared album whose user identification is Bobby (also may be called as user Bobby) includes Simon and Amy, then when the smart terminals respectively corresponding to Simon and Amy newly capture some pictures, the server may determine whether the pictures captured by the smart terminals respectively corresponding to Simon and Amy need to be synchronized to the shared album whose user identification is Bobby.

In step S102, when determining that a picture needing to be synchronized to the shared album is present, whether a face feature in the picture matches with a predefined face feature in a first list is determined, the first list being for recording a predefined face feature needing to be shared. Different people have different unique face features such that a face for a certain person can be identified based on a face feature.

In an embodiment, it is possible to identify a face in the picture needing to be synchronized to the shared album to obtain a face feature in the picture, then determine whether a predefined face feature matched with the face feature in the picture exists in the first list. In an embodiment, the number of the user identifications in the first list may be set by a user of the shared album according to pictures of persons needing to be shared. The first list may include one user identification, or may include more than one user identifications. The present disclosure does not limit the specific number.

In step 103, if the face feature in the picture matches with a predefined face feature in the first list, the picture is stored in the shared album.

In an embodiment, for example, the user Simon sets a face feature of Bobby, who is relatively close to the user Simon, in the first list, thereby when the user Simon captures a new picture via a smart terminal, it is possible to determine whether the new picture contains the face feature of Bobby. And then the picture containing the face feature of Bobby is stored in a shared album of Bobby. In this way, the picture is shared based on person, such as Simon, which facilitates the user Simon to manage pictures including relevant face in the shared album.

In the present embodiment, when determining a picture needing to be synchronized to the shared album is present, whether a predefined face feature matched with a face feature in the picture exists in a first list is determined, and if the predefined face feature matched with the face feature in the picture exists, the picture is stored in the shared album. In this way, a shared album in a unit of person corresponding to a predefined face feature is obtained, which facilitates the user to look up pictures from the shared album.

In an embodiment, the determining whether there is a picture needing to be synchronized to a shared album may include determining whether a user identification corresponding to the picture needing to be synchronized to the shared album is stored in a second list, the second list being for recording a user identification having a permission to synchronize to the shared album, if the user identification corresponding to the picture needing to be synchronized to the shared album is stored in the second list, determining that the picture needs to be synchronized to the shared album, and if the user identification corresponding to the picture needing to be synchronized to the shared album is not stored in the second list, prohibiting the picture needing to be synchronized to the shared album from synchronizing to the shared album.

In an embodiment, the method may further include when determining a user identification is accessing the shared album, determining whether the user identification is stored in a third list, the third list being for recording a user identification having an access permission to the shared album, and if the user identification accessing the shared album is stored in the third list, permitting a user corresponding to the user identification accessing the shared album to access the shared album.

In an embodiment, the method may further include identifying a face feature in each picture in a cloud album, performing a face cluster to the face features in the cloud album to obtain at least one face album, the face album including pictures having the same face feature.

For details about how to realize the sharing of picture, the follow-up embodiments may be referred to. The above methods provided by embodiments of the present disclosure may realize a shared album in a unit of person corresponding to a predefined face feature, which facilitates the user to manage pictures in the shared album. Hereinafter, the technical solutions provided by embodiments of the present disclosure will be described in specific embodiments.

Figure 2A:
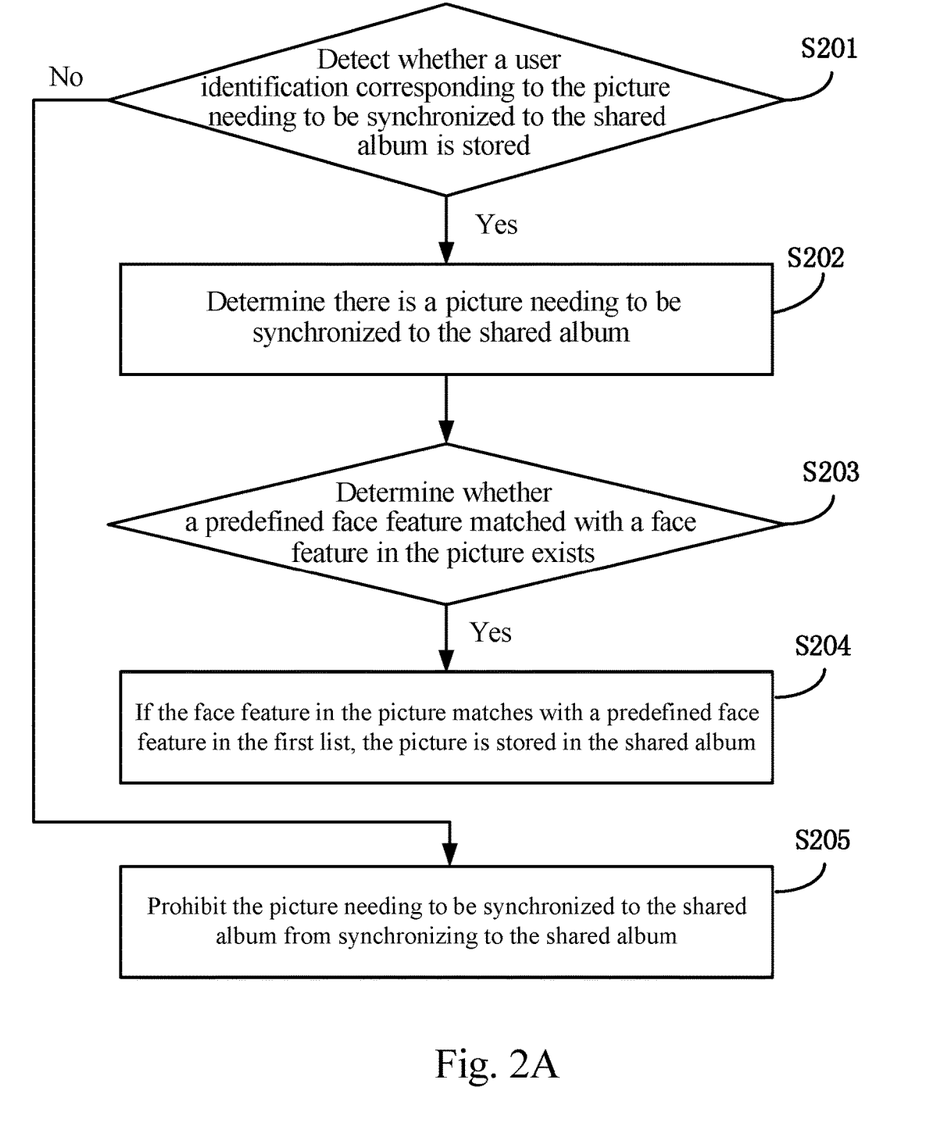
FIG. 2A is a flow chart of a method for sharing a picture, according to an exemplary first embodiment.
Figure 2B:
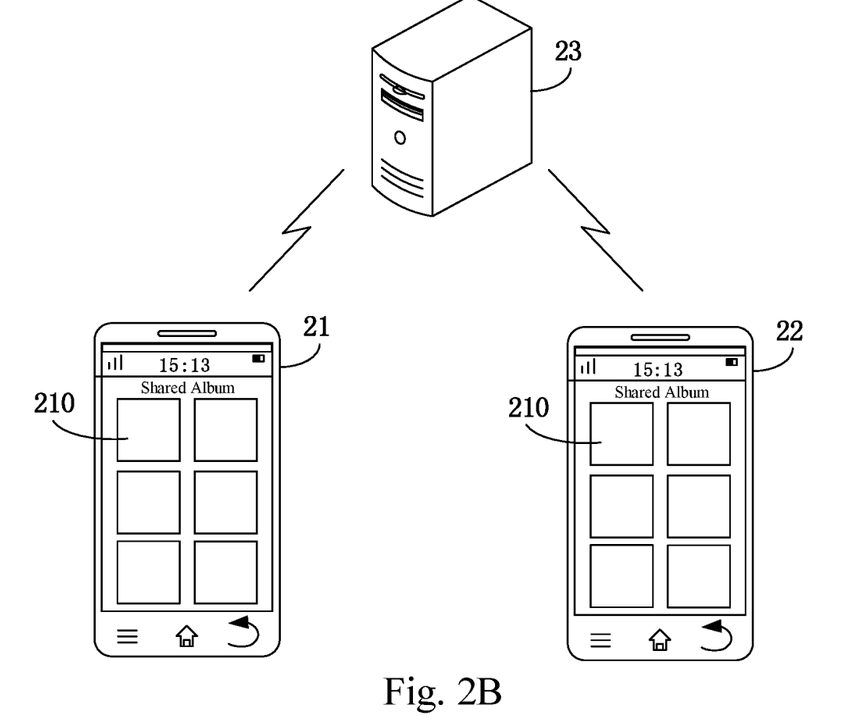
FIG. 2B is a schematic diagram of a scene applicable for the method for sharing a picture, according to an exemplary embodiment.

FIG. 2A is a flow chart of a method for sharing a picture, according to an exemplary first embodiment. FIG. 2B is a schematic diagram of a scene applicable for the method for sharing a picture, according to an exemplary embodiment. In the present embodiment, illustrative explanations are given by utilizing the above method provided by embodiments of the present disclosure, and adopting an example in which a second list is used to determine the user having a permission of sharing pictures synchronously. The present embodiment is illustrated by referring to FIG. 2B, and as shown in FIG. 2A, the method includes the following steps.

In step S201, it is determined whether a user identification corresponding to the picture needing to be synchronized to the shared album is stored in a second list. The second list includes a user identification having a permission to synchronize to the shared album. If the user identification corresponding to the picture needing to be synchronized to the shared album is stored in the second list, step S202 is performed. If the user identification corresponding to the picture needing to be synchronized to the shared album is not stored in the second list, step S205 is performed.

In an embodiment, the second list may be set by a user of the shared album according to closeness of relationship of related persons, a safety degree to the shared album. For example, the user Simon may set his wife Amy to be allowed to synchronize pictures of their son Bobby to the shared album of Simon. In an embodiment, the number of the user identifications in the second list may be set by the user of the shared album according to a range within which the user wants to synchronize pictures. The second list may include one user identification, or may include more than one user identifications, which is not restricted by the present disclosure.

In step S202, if the user identification is stored in the second list, it is determined that there is the picture needing to be synchronized to the shared album. For example, the second list corresponding to the shared album of the user Simon stores the user identification Amy. Then when Amy captures a new picture via a smart terminal, it may be determined that there is a picture needing to be synchronized to the shared album of Simon. Then the following steps are used to determine whether the picture newly captured by Amy should be synchronized to the shared album of Simon.

In step S203, when determining there is a picture needing to be synchronized to the shared album, whether there exists a predefined face feature in a first list matched with a face feature in the picture is determined, the first list including a predefined face feature needing to be shared. And if the predefined face feature matched with the face feature in the picture exists in the first list, step S204 is performed. The description of step S203 may be referred to the description to the above step S102, which is not necessary to elaborate again herein.

In step S204, if the face feature in the picture matches with a predefined face feature in the first list, the picture is stored in the shared album.

In step S205, if the user identification corresponding to the picture needing to be synchronized to the shared album is not stored in the second list, the picture needing to be synchronized to the shared album is prohibited from synchronizing to the shared album.

Hereinafter, the illustrative explanations of the present disclosure are given in combination with FIG. 2B. As shown in FIG. 2B, the user Simon stores a large number of pictures in a smart terminal 21, and the pictures are synchronized to a shared album in a server 23 by using a manner of cloud synchronization. The pictures stored in the server 23 are identified according to the user identification. In general, only the user Simon may access the pictures stored by himself in the server 23. When the user Simon creates one shared album 210 in the shared album of the server 23, the pictures may be shared to other persons (such as a user Amy) via the shared album. In an embodiment, the user Simon may allow the user Amy to share the pictures captured by Amy via a smart terminal 22 to Simon's shared album, such that the pictures of a preset person captured by Amy are timely uploaded to the shared album of Simon. Correspondingly, the user Simon may share the pictures captured by himself to his shared album, such that Amy is capable of timely access the pictures of the preset person from the shared album of Simon.

For example, Simon and Amy are husband and wife, and have a son Bobby. Simon and Amy commonly concern for Bobby. When Amy captures a picture containing a face of Bobby via a smart terminal 22, the picture containing the face of Bobby may be synchronized to the shared album of Simon in the server 23 via the smart terminal 22 instantaneously, such that Simon may find this picture via the shared alum instantaneously. For another example, when Simon captures a picture containing a face of Bobby, he may synchronize the picture containing the face of Bobby to the shared album of Simon in the server 23 via the smart terminal 21 instantaneously, such that Amy may find this picture instantaneously. In an embodiment, the shared album may not only be displayed on the smart terminal 21 of Simon, but also be displayed on the smart terminal 22 of Amy. In an embodiment, the picture containing the face of Bobby may be stored in a folder 210 in the shared album.

In the present embodiment, on the basis of the advantageous technical effects of the above embodiments, by determining whether the second list stores the user identification corresponding to the picture needing to be synchronized to the shared album, and if the user identification corresponding to the picture needing to be synchronized to the shared album is stored in the second list, synchronizing the picture captured by a user corresponding to the user identification corresponding to the picture needing to be synchronized to the shared album to the shared album instantaneously, the user may share the picture instantaneously.

Figure 3:
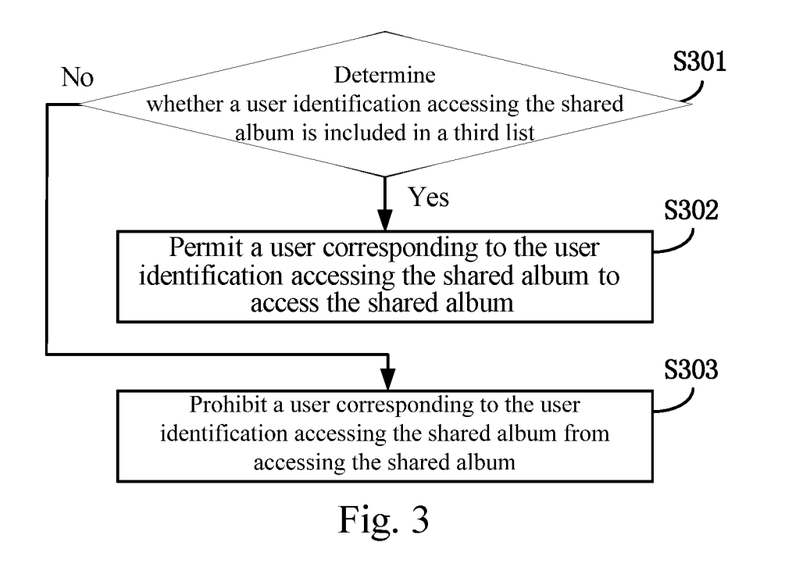
FIG. 3 is a flow chart of a method for sharing a picture, according to an exemplary second embodiment.

FIG. 3 is a flow chart of a method for sharing a picture, according to an exemplary second embodiment. In the present embodiment, illustrative explanations are given by utilizing the above method provided by embodiments of the present disclosure, and adopting an example in which a third list is used to determine the user identification having a permission of accessing the shared pictures. The present embodiment is illustrated in combination with FIG. 2B, and as shown in FIG. 3, the method includes the following steps.

In step 301, when determining that a user identification is accessing the shared album, it is determined whether the user identification is included in a third list, the third list being for recording a user identification having an access permission to the shared album. If the user identification accessing the shared album is included in the third list, step S302 is performed. If the user identification accessing the shared album is not included in the third list, step S303 is performed. The number of the user identifications in the third list may be set by the user of the shared album according to persons who are allowable to access the shared album. The third list may include one user identification, or may include more than one user identifications, which is not restricted by the present disclosure. In an embodiment, the user identification contained in the third list may be the same with, or may be different from the user identification contained in the second list mentioned in the above embodiment, which may be specifically set by the user of the shared album.

In step S302, if the third list stores the user identification accessing the shared album, a user corresponding to the user identification accessing the shared album is permitted to access the shared album.

In step S303, if the third list does not store the user identification accessing the shared album, a user corresponding to the user identification accessing the shared album is prohibited from accessing the shared album.

Hereinafter, the illustrative explanations are given in combination with FIG. 2B. As shown in FIG. 2B, when the server 23 determines that Amy accesses the shared album, the server 23 needs to determine whether the third list stores the user identification Amy. If the third list stores the user identification Amy, Amy is permitted to access the shared album of Simon. And if the third list does not store the user identification Amy, Amy is prohibited to access the shared album.

In the present embodiment, on the basis of the advantageous technical effects of the above embodiments, by determining whether the third list stores the user identification corresponding to the picture accessing the shared album, and if the user identification corresponding to the picture accessing the shared album is stored in the third list, allowing the user identification to access the shared album, and if the user identification corresponding to the picture accessing the shared album is not stored in the third list, prohibiting the user identification from accessing the shared album, it is probable to protect the shared album from being attacked by illegal users, and ensure the pictures in the shared album to be safely stored in the server.

Figure 4:
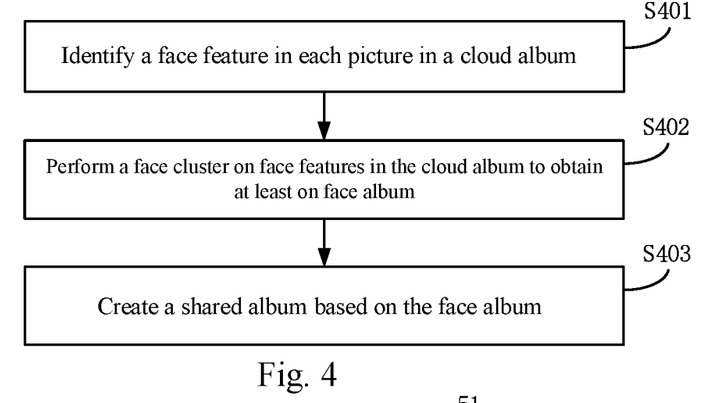
FIG. 4 is a flow chart of a method for sharing a picture, according to an exemplary third embodiment.

FIG. 4 is a flow chart of a yet another method of step S 120, according to an exemplary embodiment. In the present embodiment, illustrative explanations are given by utilizing the above method provided by embodiments of the present disclosure, and adopting an example of how to store the pictures in the shared album in a unit of face. The present embodiment is illustrated in combination with FIG. 2B, and as shown in FIG. 4, the method includes the following steps.

In step S401, a face feature in each picture in a cloud album is identified.

In step S402, a face cluster is performed on the face features in the cloud album to obtain at least one face album, the face album including pictures having the same face feature.

In step S403, a shared album is created based on the face album.

Hereinafter, the illustrative explanations are given in combination with FIG. 2B. As shown in FIG. 2B, the user Simon stores pictures in a cloud album in the server 23 via a smart terminal 21, identifies faces in all the pictures in the cloud album via a face identification method, determines a face feature corresponding to each face, performs a face cluster on the face features in the cloud album to obtain at least one picture group including pictures containing the same face feature. For example, by performing face identification to each picture in the shared album of Simon, face features of Amy, Bobby, Sunny, and etc. are obtained, then by performing a cluster to pictures respectively corresponding to Amy, Bobby and Sunny, at least one face album containing the face features of Amy, Bobby, Sunny, and etc. are obtained, such that a shared album may be created by the face album containing the face features of Amy, Bobby, and Sunny. For example, a shared album containing the face feature of Bobby is created, and Amy may check all pictures about Bobby when accessing the shared album, so as to store pictures in the shared album in a unit of face feature, and facilitate Simon and Amy to manage pictures of Bobby in the shared album.

In the present embodiment, by performing cluster to the pictures in the shared album by using a manner of face feature, the shared album in a unit of person is achieved, and it is convenient for the user to manage pictures in the shared album.

Figure 5:
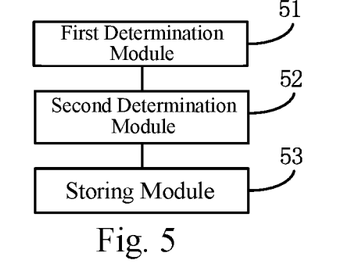
FIG. 5 is a block diagram of a device for sharing a picture, according to an exemplary embodiment.

FIG. 5 is a block diagram of a device for sharing a picture, according to an exemplary embodiment. As shown in FIG. 5, the device for sharing a picture includes a first determination module 51, a second determination module 52, and a storing module 53.

The first determination module 51 is configured to determine whether there is a picture needing to be synchronized to a shared album.

The second determination module 52 is configured to, when the first determination module 51 determines a picture needing to be synchronized to the shared album, determine whether a predefined face feature matched with a face feature in the picture exists in a first list, the first list being for recording a predefined face feature needing to be shared.

The storing module 53 is configured to, if the second determination module 52 determines that the predefined face feature matched with the face feature in the picture exists, store the picture in the shared album.

Figure 6:
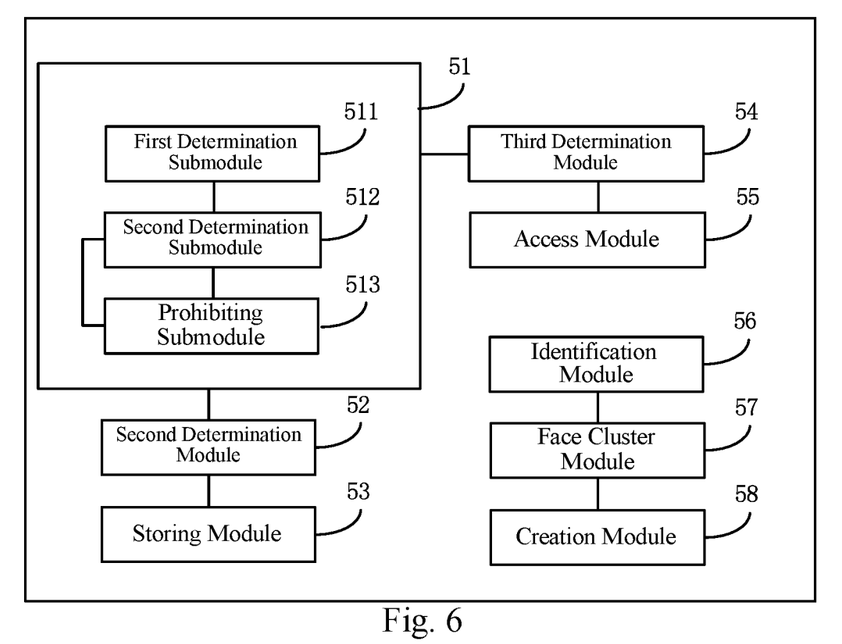
FIG. 6 is a block diagram of another device for sharing a picture, according to an exemplary embodiment.

FIG. 6 is a block diagram of another device for sharing a picture, according to an exemplary embodiment. On basis of the above embodiment shown in FIG. 5, in an embodiment, as shown in FIG. 6, the first determination module 51 may include a first determination submodule 511, a second determination submodule 512, and a prohibiting submodule 513.

The first determination submodule 511 is configured to determine whether a user identification corresponding to the picture needing to be synchronized to the shared album is stored in a second list, the second list being for recording a user identification having a permission to synchronize.

The second determination submodule 512 is configured to, if the first determination submodule 511 determines that the user identification corresponding to the picture needing to be synchronized to the shared album is stored in the second list, determine there is the picture needing to be synchronized to the shared album.

The prohibiting submodule 513 is configured to, if the first determination submodule 511 determines that the user identification corresponding to the picture needing to be synchronized to the shared album is not stored in the second list, prohibit the picture needing to be synchronized to the shared album from synchronizing to the shared album.

In an embodiment, the device may further include: a third determination module 54, and an access module 55.

The third determination module 54 is configured to, when the first determination module 51 determines a user identification accessing the shared album, determine whether the user identification is stored in a third list, the third list being for recording a user identification having an access permission to the shared album.

The access module 55 is configured to, if third determination module 54 determines that the user identification accessing the shared album is stored in the third list, permit a user corresponding to the user identification accessing the shared album to access the shared album.

In an embodiment, the device may further include: an identification module 56, a face cluster module 57, and a creation module 58.

The identification module 56 is configured to identify a face feature in each picture in a cloud album.

The face cluster module 57 is configured to perform a face cluster on the face feature in the cloud album identified by the identification module 56 to obtain at least one face album, the face album including pictures having the same face feature.

The creation module 58 is configured to create the shared album based on the face album obtained by the face cluster module 57.

With respect to the devices in the above embodiments, the specific manners for performing operations for individual modules therein have been described in detail in the embodiments regarding the methods, which will not be elaborated herein.

Figure 7:
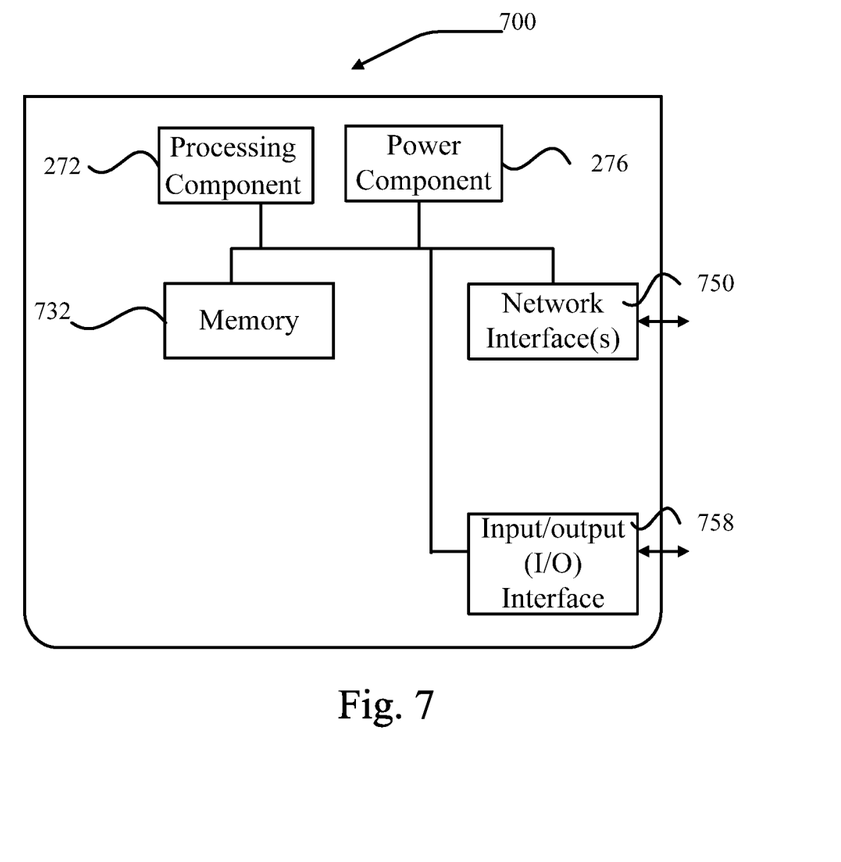
FIG. 7 is a block diagram applicable for a device for sharing a picture, according to an exemplary embodiment.

FIG. 7 is a block diagram applicable for a device for sharing a picture, according to an exemplary embodiment. For example, the device 700 may be provided as a smart mobile phone, or a tablet computer. Referring to FIG. 7, the device 700 includes a processing component 722 that further includes one or more processors, and memory resources represented by a memory 732 for storing instructions executable by the processing component 722, such as application programs. The application programs stored in the memory 732 may include one or more modules each corresponding to a set of instructions. Further, the processing component 722 is configured to execute the instructions to perform the following method for sharing a picture.

The device 700 may also include a power component 726 configured to perform power management of the device 700, wired or wireless network interface(s) 750 configured to connect the device 700 to a network, and an input/output (I/O) interface 758. The device 700 may operate based on an operating system stored in the memory 732, such as Windows Server™ Mac OS X™, Unix™, Linux™, FreeBSD™, or the like.

Each module discussed above, such as the first determination module 51, the second determination module 52, and the storing module 53, may take the form of a packaged functional hardware unit designed for use with other components, a portion of a program code (e.g., software or firmware) executable by the processor or the processing circuitry that usually performs a particular function of related functions, or a self-contained hardware or software component that interfaces with a larger system, for example Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for sharing a picture on a cloud server, comprising:
   identifying, by a cloud server comprising a memory and a processor in communication with the memory, a face feature in each picture in a cloud album in the cloud server;
   performing, by the cloud server, a face cluster on the identified face feature in the each picture in the cloud album to obtain at least one face album, each of the at least one face album comprising pictures having a same face feature;
   creating, by the cloud server, a shared album based on the at least one face album;
   determining, by the cloud server, whether a picture to be synchronized to the shared album is present in a first terminal;
   when it is determined that the picture to be synchronized to the shared album is present in the first terminal, determining, by the cloud server, whether a face feature in the picture corresponds to a predefined face feature in a first list, the first list being locally stored in the first terminal and including one or more predefined face features relating to people associated with the shared album; and
   when it is determined that the face feature in the picture corresponds to the predefined face feature in the first list, storing, by the cloud server, the picture in the shared album.

2. The method of claim 1, wherein the determining whether the picture to be synchronized to the shared album is present in the first terminal comprises:
   determining, by the cloud server, whether a user identification corresponding to the picture to be synchronized to the shared album is included in a second list stored in the first terminal, the second list including one or more user identifications having a permission to synchronize to the shared album;
   when it is determined that the user identification corresponding to the picture to be synchronized to the shared album is included in the second list, determining, by the cloud server, that the picture to be synchronized to the shared album is present in the first terminal.

3. The method of claim 2, further comprising:
   prohibiting, by the cloud server, the picture to be synchronized to the shared album from synchronizing to the shared album when it is determined that the user identification corresponding to the picture to be synchronized to the shared album is not included in the second list.

4. The method of claim 1, further comprising:
   receiving, by the cloud server, an access request to the shared album from a user of a second terminal;
   determining, by the cloud server, whether a user identification for the user is included in a third list stored in the first terminal, the third list including one or more user identifications having an access permission to the shared album; and
   permitting, by the cloud server, the user to access the shared album when the user identification for the user is stored in the third list.

5. The method of claim 1, wherein the shared album is created by a second user other than a first user of the first terminal.

6. The method of claim 1, further comprising
   uploading, by the cloud server, the picture to the cloud server when the face feature in the picture corresponds to a predefined face feature in the first list.

7. A device for sharing a picture, comprising:
   a memory for storing instructions; and
   a processor in communication with the memory, wherein, when the processor executes the instructions, the processor is configured to cause the device to:
   identify a face feature in each picture in a cloud album in the device;
   perform a face cluster on the identified face feature in the each picture in the cloud album to obtain at least one face album, each of the at least one face album comprising pictures having a same face feature;
   create a shared album based on the at least one face album;
   determine whether a picture to be synchronized to the shared album in the device is present in a terminal;
   determine whether a face feature in the picture matches with a predefined face feature in a first list, the first list being locally stored in the terminal, when the picture to be synchronized to a shared album in the device is present in the terminal, the first list including one or more predefined face features relating to people associated with the shared album; and store the picture in the shared album when the face feature in the picture matches with a predefined face feature in the first list.

8. The device of claim 7, wherein, when the processor is configured to cause the device to determine whether the picture to be synchronized to the shared album is present, the processor is configured to cause the device to:
   determine whether a user identification corresponding to the picture to be synchronized to the shared album is included in a second list, the second list including one or more user identifications having a permission to synchronize to the shared album;
   determine whether the picture to be synchronized to the shared album is present in the terminal when the user identification corresponding to the picture to be synchronized to the shared album is included in the second list.

9. The device of claim 8, wherein, when the processor executes the instructions, the processor is further configured to cause the device to:
   prohibit the picture to be synchronized to the shared album from synchronizing to the shared album when a user identification corresponding to the picture to be synchronized to the shared album is not included in the second list.

10. The device of claim 7, wherein, when the processor executes the instructions, the processor is further configured to cause the device to:
    receive an access request to the shared album from a user;

determine whether a user identification for the user is stored in a third list, the third list including one or more user identifications having an access permission to the shared album; and permit the user to access the shared album when the user identification for the user is stored in the third list.

11. A non-transitory readable storage medium comprising instructions, executable by a processor in a server, for performing a method for sharing a picture, the instructions, when executed by the processor, cause the serve server to perform:

identifying, by a cloud server comprising a memory and a processor in communication with the memory, a face feature in each picture in a cloud album in the cloud server;

performing, by the cloud server, a face cluster on the identified face feature in the each picture in the cloud album to obtain at least one face album, each of the at least one face album comprising pictures having a same face feature;

creating, by the cloud server, a shared album based on the at least one face album;

determining whether a picture to be synchronized to the shared album in the server is present in a terminal;

determining whether a face feature in the picture matches with a predefined face feature in a first list, the first list being locally stored in the terminal, when the picture to be synchronized to the shared album in the server is present in the terminal, the first list including one or more predefined face features relating to people associated with the shared album; and storing the picture in the shared album when the face feature in the picture matches with the predefined face feature in the first list.

* * * * *

UNITED STATES PATENT AND TRADEMARK OFFICE
CERTIFICATE OF CORRECTION

PATENT NO. : 10,142,414 B2
APPLICATION NO. : 15/077699
DATED : November 27, 2018
INVENTOR(S) : Zhijun Chen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 68 days.

Signed and Sealed this
Fourteenth Day of May, 2019

Andrei Iancu
*Director of the United States Patent and Trademark Office*